(12) United States Patent
Napadensky

(10) Patent No.: US 9,662,839 B2
(45) Date of Patent: May 30, 2017

(54) PREPARATION OF BUILDING MATERIAL FOR SOLID FREEFORM FABRICATION

(75) Inventor: Eduardo Napadensky, Natania (IL)

(73) Assignee: Stratasys Ltd., Rehovot (IL)

( * ) Notice: Subject to any disclaimer, the term of this patent is extended or adjusted under 35 U.S.C. 154(b) by 0 days.

(21) Appl. No.: 13/539,513

(22) Filed: Jul. 2, 2012

(65) Prior Publication Data

US 2012/0276233 A1 Nov. 1, 2012

Related U.S. Application Data

(62) Division of application No. 12/327,857, filed on Dec. 4, 2008, now abandoned.

(51) Int. Cl.
*B29C 41/02* (2006.01)
*B29C 67/00* (2017.01)

(52) U.S. Cl.
CPC ...... *B29C 67/0085* (2013.01); *B29C 67/0088* (2013.01); *B29C 67/0059* (2013.01)

(58) Field of Classification Search
CPC .................. B29C 67/0085; B29C 67/0088
USPC ........ 425/174.4, 145; 366/132, 152.1, 152.3, 366/125.5, 160.1, 162.1; 264/308
See application file for complete search history.

(56) References Cited

U.S. PATENT DOCUMENTS

| | | | |
|---|---|---|---|
| 4,342,793 A | 8/1982 | Skinner et al. | |
| 4,433,917 A | 2/1984 | Mendel et al. | |
| 4,830,508 A * | 5/1989 | Higuchi et al. | 366/141 |
| 5,110,521 A * | 5/1992 | Moller | 264/40.4 |
| 5,149,548 A | 9/1992 | Yamane et al. | |
| 5,863,486 A | 1/1999 | Ozaki et al. | |
| 6,007,318 A | 12/1999 | Russell et al. | |
| 6,129,872 A | 10/2000 | Jang | |
| 6,242,149 B1 | 6/2001 | Maeda | |
| 6,259,962 B1 | 7/2001 | Gothait | |
| 6,533,449 B1 | 3/2003 | Auad | |
| 6,569,373 B2 | 5/2003 | Napadensky | |
| 6,580,334 B2 | 6/2003 | Simburger et al. | |
| 6,586,494 B2 | 7/2003 | Mejiritski et al. | |
| 6,658,314 B1 * | 12/2003 | Gothait | 700/119 |
| 6,782,303 B1 | 8/2004 | Fong | |
| 6,850,334 B1 | 2/2005 | Gothait | |
| 6,863,859 B2 | 3/2005 | Levy | |
| 6,919,385 B2 | 7/2005 | Hayashi | |
| 7,183,335 B2 | 2/2007 | Napadensky | |
| 7,209,797 B2 | 4/2007 | Kritchman et al. | |
| 7,225,045 B2 | 5/2007 | Gothait et al. | |
| 7,277,770 B2 | 10/2007 | Huang | |
| 7,300,613 B2 * | 11/2007 | Sano et al. | 264/113 |
| 7,300,619 B2 | 11/2007 | Napadensky et al. | |

(Continued)

FOREIGN PATENT DOCUMENTS

DE 9319561 5/1994
WO WO 2005/045523 5/2005

(Continued)

OTHER PUBLICATIONS

Communication Relating to the Results of the Partial International Search Report Dated Jan. 28, 2008 From the International Searching Authority Re.: Application No. PCT/IL2007/000429.

(Continued)

*Primary Examiner* — Michael H Wilson
*Assistant Examiner* — Robert Dye

(57) ABSTRACT

A method suitable for solid freeform fabrication is disclosed. The method comprises mixing respective amounts of a plurality of materials such as to provide a building material characterized by at least one attribute, and using the building material for fabricating a three-dimensional object.

25 Claims, 3 Drawing Sheets

(56) References Cited

U.S. PATENT DOCUMENTS

| | | |
|---|---|---|
| 7,307,123 B2 | 12/2007 | Johnson et al. |
| 7,364,686 B2 | 4/2008 | Kritchman et al. |
| 7,500,846 B2 | 3/2009 | Eshed et al. |
| 7,604,768 B2 | 10/2009 | Kritchman |
| 2001/0003004 A1 | 6/2001 | Leyden et al. |
| 2003/0004599 A1 | 1/2003 | Herbak |
| 2003/0151167 A1 | 8/2003 | Kritchman et al. |
| 2004/0187714 A1 | 9/2004 | Napadensky et al. |
| 2004/0207124 A1 | 10/2004 | Kritchman et al. |
| 2005/0104241 A1 | 5/2005 | Kritchman et al. |
| 2006/0127153 A1 | 6/2006 | Menchik et al. |
| 2006/0148967 A1* | 7/2006 | McClain et al. ............. 524/497 |
| 2006/0160250 A1* | 7/2006 | Bonassar et al. ................ 438/1 |
| 2007/0007698 A1 | 1/2007 | Sano |
| 2007/0179656 A1 | 8/2007 | Eshed et al. |
| 2008/0146777 A1 | 6/2008 | Sasa |
| 2010/0140852 A1 | 6/2010 | Kritchman et al. |

FOREIGN PATENT DOCUMENTS

| | | |
|---|---|---|
| WO | WO 2005/113219 | 12/2005 |
| WO | WO 2006/045002 | 4/2006 |
| WO | WO 2008/120183 | 10/2008 |
| WO | WO 2009/013751 | 1/2009 |

OTHER PUBLICATIONS

International Preliminary Report on Patentability Dated Oct. 15, 2009 From the International Bureau of WIPO Re.: Application No. PCT/IL2007/000429.

International Search Report Dated Jul. 31, 2008 From the International Searching Authority Re.: PCT/IL2007/000429.

Official Action Dated Jan. 3, 2012 From the US Patent and Trademark Office Re. U.S. Appl. No. 12/327,857.

Official Action Dated Apr. 10, 2012 From the US Patent and Trademark Office Re. U.S. Appl. No. 12/591,903.

Official Action Dated Dec. 11, 2009 From the US Patent and Trademark Office Re. U.S. Appl. No. 12/327,857.

Official Action Dated Feb. 16, 2011 From the US Patent and Trademark Office Re. U.S. Appl. No. 12/327,857.

Official Action Dated Aug. 17, 2011 From the US Patent and Trademark Office Re. U.S. Appl. No. 12/591,903.

Official Action Dated May 19, 2010 From the US Patent and Trademark Office Re. U.S. Appl. No. 12/327,857.

Official Action Dated Jun. 27, 2011 From the US Patent and Trademark Office Re. U.S. Appl. No. 12/591,903.

Response Dated Mar. 11, 2010 to Official Action of Dec. 11, 2009 From the US Patent and Trademark Office Re. U.S. Appl. No. 12/327,857.

Response Dated Aug. 16, 2011 to Official Action of Feb. 16, 2011 From the US Patent and Trademark Office Re. U.S. Appl. No. 12/327,857.

Response Dated Nov. 18, 2010 to Official Action of May 19, 2010 From the US Patent and Trademark Office Re. U.S. Appl. No. 12/327,857.

Response Dated Jul. 25, 2011 to Official Action of Jun. 27, 2011 From the US Patent and Trademark Office Re. U.S. Appl. No. 12/591,903.

Written Opinion Dated Jul. 31, 2008 From the International Searching Authority Re.: Application No. PCT/IL2007/000429.

Hoyle et al. "Thiol-Enes: Chemistry of the Past With Promise for the Future", Journl of Polymer Science, Part A: Polymer Chemistry, 42: 5301-5338, 2004.

\* cited by examiner

PREPARATION OF BUILDING MATERIAL FOR SOLID FREEFORM FABRICATION

RELATED APPLICATION

This application is a divisional of U.S. patent application Ser. No. 12/327,857 filed on Dec. 4, 2008, the contents of which are incorporated by reference as if fully set forth herein.

FIELD AND BACKGROUND OF THE INVENTION

The present invention relates to solid freeform fabrication (SFF) and, more particularly, to apparatus, system and method for the preparation of building material for solid freeform fabrication.

Solid freeform fabrication processes are defined as processes in which objects are constructed in layers utilizing a computer model of the objects. The layers are deposited or formed by a suitable device which receives signals from a computer using, e.g., a computer aided design (CAD) software.

Solid freeform fabrication is typically used in design-related fields where it is used for visualization, demonstration and mechanical prototyping. Thus, solid freeform fabrication facilitates rapid fabrication of functioning prototypes with minimal investment in tooling and labor. Such rapid prototyping shortens the product development cycle and improves the design process by providing rapid and effective feedback to the designer. Solid freeform fabrication can also be used for rapid fabrication of non-functional parts, e.g., for the purpose of assessing various aspects of a design such as aesthetics, fit, assembly and the like. Additionally, solid freeform fabrication techniques have been proven to be useful in the fields of medicine, where expected outcomes are modeled prior to performing procedures. It is recognized that many other areas can benefit from rapid prototyping technology, including, without limitation, the fields of architecture, dentistry and plastic surgery where the visualization of a particular design and/or function is useful.

Various solid freeform fabrication techniques exist. One such technique, known as three-dimensional printing is disclosed in, e.g., U.S. Pat. Nos. 6,259,962, 6,569,373, 6,658,314, 6,850,334, 6,863,859, 7,183,335, 7,209,797, 7,225,045 and 7,300,619 and U.S. Published Application Nos. 20040207124, 20050104241 and 20070179656, the contents of which are hereby incorporated by reference. In this technique, building materials are dispensed from a printing head having a set of nozzles to deposit layers on a supporting structure. Depending on the building materials, the layers are then cured using a suitable curing device. The building materials may include modeling materials and support materials, which form the object and the support constructions supporting the object as it is being built.

U.S. Pat. No. 5,149,548 discloses apparatus for three-dimensional printing of an object from a two-part curable material and a setting material. The setting material is encapsulated in microcapsules and the apparatus uniformly disperses the microcapsules into the two-part curable material. A rupturing unit ruptures the microcapsules so as to cure the curable material. The two-part curable materials may be of different kinds and/or colors.

Also of interest is U.S. Pat. No. 6,007,318 which discloses a printer which forms three-dimensional objects from a powder by selectively applying a binder liquid to the powder. The binders may be used with or include dyes which may be combined to create a plurality of colors. Binder liquid and dyes may be deposited at selected locations of the powder.

SUMMARY OF THE INVENTION

It has been recognized that in many applications there is a need to build objects using building materials with different properties. This is the case, for example, when different objects need to be built, each one using a different color or using a building material having a different mechanical property. Since the number of potentially desirable colors or mechanical properties, for example, is almost limitless, there is no practical possibility to manufacture and/or produce such a large number of different building materials.

Use of separate materials in different colors or kinds limits the number of colors or kinds available for use and would necessitate storage of a number of separate containers of material; thus being both limiting and inconvenient for the end-user.

In addition, even limiting the number of building materials to a limited set would result in the need to stock a large number of building materials, with all the logistic and capital implications of such stock.

Another problem that needs to be addressed when storing different modeling materials, is the shelf life of the various materials. Different building materials may have different shelf lives, according to their specific compositions.

With respect to the application of a binder liquid to powder, it was found that while offering a wider range of colors, the jetting of binders and/or dyes onto powder is inherently problematic due to dispersion or spreading of powder upon impact of the jetted materials. In addition, the amount of liquid jetted onto the powder must be limited relative to the amount of powder so as not to negatively affect the formation of the part. Therefore the amount of dye being used would by necessity also have to be limited, irrelevant of the final color desired to be attained.

According to an aspect of some embodiments of the present invention there is provided a method of solid free form fabrication of an object, comprising: (a) mixing respective amounts of a plurality of materials such as to provide a building material characterized by at least one predetermined attribute of combination; and (b) using the building material for fabricating a three-dimensional object; the steps (a) and (b) being performed in the same facility.

According to some embodiments of the invention the step (b) is performed less than 24 hours after the step (a).

According to some embodiments of the invention the steps (a) and (b) are performed by the same individual or group of individuals.

According to some embodiments of the invention the materials comprise a base material and at least one additive material being able to produce a predetermined attribute when mixed with the base material.

According to some embodiments of the present invention the base material comprises a polymerizable material and the additive material comprises a substance able to affect at least one of the following properties of the base material: reactivity, color, rheology of the liquid state composition and mechanical properties of the resulting solid material.

According to some embodiments of the invention the base material comprises substances comprising hydroxyl functions According to some embodiments of the invention the additive material comprises isocyanate functions.

According to some embodiments of the invention the method further comprising employing at least one procedure selected from the group consisting of polymerization, UV curing, thermal curing, UV post-curing and thermal post-curing.

According to some embodiments of the invention the building material is a UV curable composition.

According to some embodiments of the invention the building material at least partially solidifies upon exposure to radiation selected from the group comprising electromagnetic radiation and electron beam radiation.

According to some embodiments of the present invention the electromagnetic radiation is characterized by a frequency range selected from the group consisting of UV frequency range, Infra-Red frequency range and Visible light frequency range.

According to some embodiments of the invention one of the plurality of materials comprises meth/acrylic functional groups and another one of the plurality of materials comprises mercaptopropionate functional groups.

According to some embodiments of the invention one of the plurality of materials comprises a component containing hydroxyl functional groups and another one of the plurality of materials comprises a component containing an isocyanate functional group.

According to some embodiments of the invention at least two materials are characterized by different post-hardening attributes selected from the group consisting of color, hardness, elasticity, translucency, density, electrical conductivity, magnetization and any collection thereof.

According to some embodiments of the invention at least one material of the plurality of material is a building material additive.

According to some embodiments of the invention the building material additive comprises photoinitiator.

According to some embodiments of the invention the building material has a shelf life which is shorter than 200 days According to some embodiments of the invention the building material has a shelf life which is shorter than the shelf life of each of the plurality of materials before mixing.

According to some embodiments of the invention the using the building material for fabricating the three-dimensional object comprises loading the building material to a solid freeform fabrication apparatus having a user interface and utilizing the user interface for feeding information on the respective amounts and/or the at least one predetermined attribute of combination.

According to some embodiments of the invention the method further comprising calculating printing parameters according to the respective amounts and feeding information on the printing parameters to the user interface.

According to some embodiments of the invention the mixing comprises operating a preparation apparatus which comprises: an input unit, for inputting the at least one attribute; a control unit, configured to transmit data pertaining to the amounts, the control unit being supplemented with an algorithm for determining the amounts; a supply unit, operatively associated with reservoirs of the plurality of materials and being controllable by the control unit to supply a respective amount of each material according to the data; and a container, configured for receiving the plurality of materials.

According to some embodiments of the invention the preparation apparatus comprises a mixer, configured for receiving the plurality of materials and for mixing the materials According to some embodiments of the invention the mixing comprises operating at least one attribute measuring device, configured for measuring at least one attribute of a sample of at least one of the plurality of materials.

According to some embodiments of the invention the flow control device comprises at least one element selected from the group consisting of a valve and a pump.

According to some embodiments of the invention the preparation apparatus further comprises a computer readable medium mounted on the container and being capable of storing the respective amounts and/or the at least one predetermined attribute of combination.

According to some embodiments of the invention the using the building material for fabricating the three-dimensional object comprises loading the container to a solid freeform fabrication apparatus having a reading and/or writing functionality configured to read and/or write data from the computer readable medium.

According to some embodiments of the invention the solid freeform fabrication apparatus is operable to mix the plurality of materials, and the mixing comprises operating the solid freeform fabrication so as to mix the materials.

According to some embodiments of the invention the mixing comprises adding an additive material to a container containing a base material, followed by shaking the container.

According to some embodiments of the invention the adding the additive comprises using a syringe to inject the additive into the container.

According to some embodiments of the invention the container is loaded into a solid freeform fabrication apparatus.

According to some embodiments of the present invention the container comprises a computer readable and/or writeable medium mounted on the container and being capable of storing respective amounts and/or at least one attribute of the materials it contains, and the solid freeform apparatus comprises a reading and/or writing functionality configured to read and/or write data from the computer readable medium.

According to an aspect of some embodiments of the present invention there is provided apparatus for preparing a building material for solid freeform fabrication, the apparatus comprising: an input unit, for inputting at least one attribute of the building material; a control unit, configured to transmit data pertaining to respective amounts of a plurality of different materials according to the at least one attribute, the control unit being supplemented with an algorithm for determining the amounts; a supply unit, operatively associated with reservoirs of the plurality of materials and being controllable by the control unit to supply a respective amount of materials according to the data; and a container, configured for receiving the plurality of materials.

According to some embodiments of the invention the materials comprise a base modeling material and a plurality of additive materials, each additive being able to produce at least one attribute when mixed with the base modeling material.

According to some embodiments of the invention the apparatus further comprising a mixer, configured for receiving the materials and for mixing the materials thereby to provide a building material characterized by the at least one attribute.

According to some embodiments of the invention the mixer is external to the apparatus and is configured for supplying the container with building material.

According to some embodiments of the invention the building material is characterized by a post-hardening attribute selected from the group consisting of color, hardness, elasticity, translucency, density, electrical conductivity, magnetization and any collection thereof.

According to some embodiments of the invention the additive comprises photoinitiator.

According to some embodiments of the invention the supply unit comprises: a plurality of conduits, each being in fluid communication with a reservoir of one material and having a flow control device controllable by the control unit to enable and disable flow of material in the conduit; and at least one amount-measuring device, designed and constructed to measure amounts of materials flowing in the plurality of conduits.

According to some embodiments of the invention the apparatus further comprising a computer readable and/or writeable medium mounted on the container and being capable of storing the respective amounts and/or the at least one attribute and/or printing parameters of the materials received.

According to some embodiments of the invention the apparatus further comprising at least one attribute measuring device, configured for measuring at least one attribute of a material.

According to an aspect of some embodiments of the present invention there is provided a system for solid freeform fabrication, comprising a preparation apparatus, for preparing a building material characterized by at least one attribute, and a solid freeform fabrication apparatus, for fabricating a three-dimensional object using the building material, wherein the preparation apparatus is designed and constructed for mixing respective amounts of a plurality of materials according to the at least one attribute, such as to provide the building material.

According to some embodiments of the invention the plurality of materials comprises a base modeling material and a plurality of additive materials able to produce a desired attribute in the base modeling material when the materials are mixed.

According to some embodiments of the invention each material is characterized by a different attribute selected from the group consisting of color, hardness, elasticity, translucency, polymerizability, viscosity, density, electrical conductivity, magnetization and any collection thereof.

According to some embodiments of the invention the building materials is characterized by a post-hardening attribute selected from the group consisting of color, hardness, elasticity, translucency, density, electrical conductivity, magnetization and any collection thereof.

According to some embodiments of the invention at least one additive material comprises photoinitiator.

According to some embodiments of the invention the preparation apparatus comprises: an input unit, for inputting the at least one attribute; a control unit, configured to transmit data pertaining to the amounts, the control unit being supplemented with an algorithm for determining the amounts; a supply unit, operatively associated with reservoirs of the plurality of materials and being controllable by the control unit to supply a respective amount of each material according to the data; and a mixer, configured for receiving the plurality of materials and for mixing the materials thereby to provide the building material.

According to some embodiments of the invention the supply unit comprises: a plurality of conduits, each being in fluid communication with a reservoir of one material, and having a flow control device controllable by the control unit to enable and disable flow of material in the conduit; a container for receiving materials flowing in the plurality of conduits; and at least one amount-measuring device, designed and constructed to measure amounts of materials flowing in the plurality of conduits.

According to some embodiments of the invention the preparation apparatus is operable to mix the respective amounts of the plurality of materials, generally contemporaneously with the fabricating of the three-dimensional object.

According to some embodiments of the invention the preparation apparatus further comprises a computer readable medium mounted on the container and being capable of storing the respective amounts and/or the at least one attribute.

According to some embodiments of the invention the solid freeform fabrication apparatus comprises a reading and/or writing functionality configured to read and/or write data from the computer readable medium.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
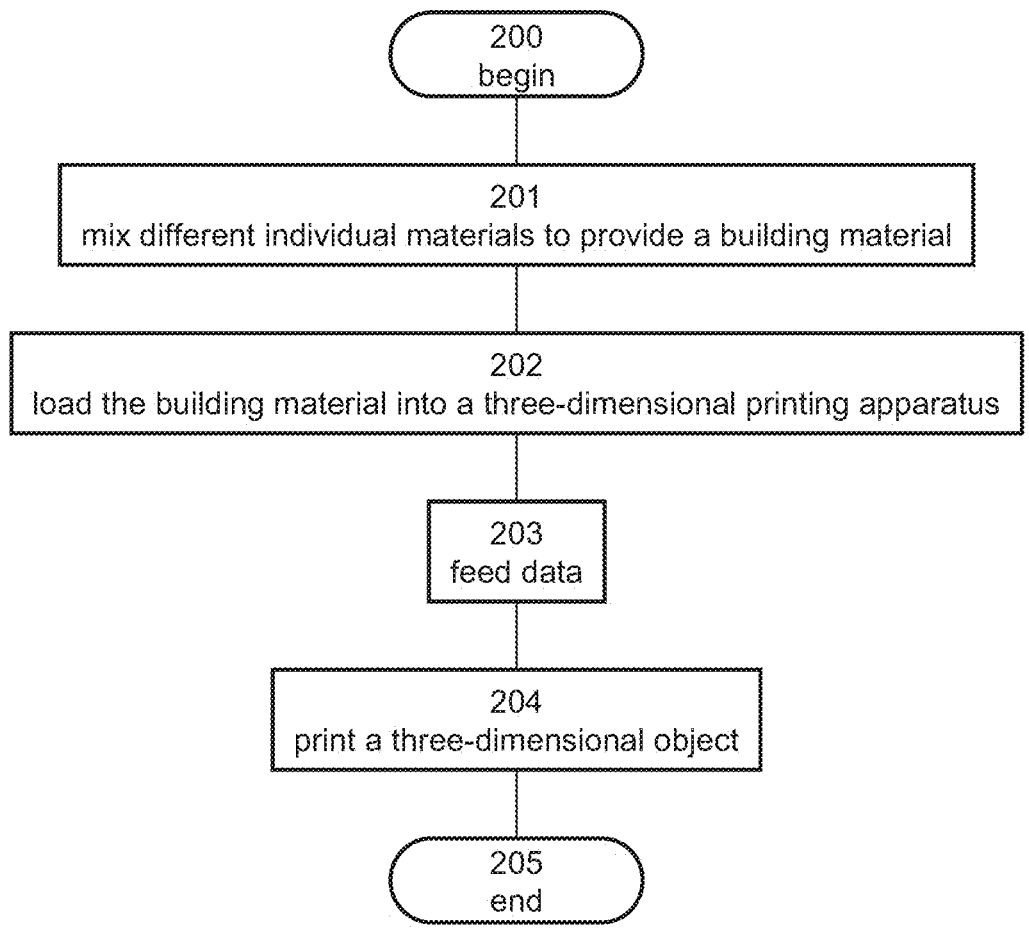
FIG. 1 is a flowchart diagram describing a method for solid freeform fabrication of an object, according to various exemplary embodiments of the present invention.

The present embodiments comprise a method, apparatus and system which can be used for solid freeform fabrication. Specifically, the present embodiments can be used for preparing building material having one or more specific, predefined attributes and for fabricating a three-dimensional object using the prepared material.

The principles and operation of a method, apparatus and system according to the present embodiments may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

According to a preferred embodiment of the present invention, there is provided a method for solid freeform fabrication (SFF) comprising preparing a modeling material by: selecting an attribute or property desired to characterize the modeling material composition, selecting modeling material(s) and optionally modeling material additives, the combination of which may impart said desired attribute or property to the modeling material, mixing the modeling materials and additive/s, and fabricating a three-dimensional object with the mixed modeling material using SFF apparatus.

According to another preferred embodiment of the present invention, the method comprises mixing modeling material(s) and/or optionally material additive/s, wherein the mixed material is characterized by having a shorter shelf life than that of the modeling material prior to mixing. Because of the shortened shelf life, mixing should preferably be carried out close to or shortly before the modeling material mix is used for printing or building. The shelf life of the mixed material may be less than 200 days, or less than 150 days, or less than 100 days, or less than 50 days, or less than 30 days, or less than 14 days, or less than 7 days.

An example of the above is addition of an additive with a short shelf life to the modeling material, wherein the lifetime of the mix is, as a result, shorter than the shelf life of the modeling material. In some embodiments of the present invention the additive is a small amount of material. This allows transporting the additive to the user shortly before use, according to user demand. In some embodiments of the present invention the modeling material and the additive separately have long shelf-lives, but when mixed together, the shelf life of the resulting mixed material is significantly shortened.

Thus there is provided a method for SFF comprising preparing a modeling material by: selecting an attribute or property desired to characterize the modeling material composition, selecting a modeling material and a modeling material additive or additives which will impart the desired attribute or property to the modeling material, mixing the modeling material and additive and fabricating a three-dimensional object with the modified modeling material using a SFF apparatus.

Different modeling material additives impart different properties to a single modeling material. Therefore the ability to use different modeling material additives in different quantities, as required, enables the obtainment of numerous different modeling materials, each having different properties, preferably from a single base modeling material.

In some embodiments of the present invention a single modeling material is used as a base material to which may be added different additives to achieve different properties, thus enabling exploitation of the shelf-life of the base modeling material and/or enabling the preparation of a number of different modeling materials out of a single modeling material. In addition, the range of properties which may be imparted to the base modeling material is greater than has been available with known technologies to date. The method according to some embodiments of the present invention has significant logistical advantages in that (a) less modeling material needs to be purchased, since instead of purchasing a large number of different modeling materials, according to some embodiments of the invention single base modeling materials may used and additives need only be purchased in small amounts, if and when necessary, (b) less storage place is necessary, for the same reasons, and (c) there is less material waste due to (i) preservation of the shelf-life of the materials and (ii) less materials and smaller amounts of materials, purchased if and when necessary, increasing the likelihood that all materials purchased will be used, instead of larger amounts of separate modeling materials needing to be purchased and stored, some or part of which may remain unused and eventually discarded.

Therefore, instead of purchasing and storing numerous different modeling materials, the user that uses the method of the present embodiments can purchase and store only one base material and a few additives, and order additives in small amounts only when needed.

Referring now to the drawings, FIG. 1 is a flowchart diagram of a method suitable for solid freeform fabrication of an object. It is to be understood that unless otherwise defined, the method steps described hereinbelow can be executed either simultaneously or sequentially in many combinations or orders of execution. Specifically, the ordering of the flowchart diagrams is not to be considered as limiting. For example, two or more method steps, appearing in the following description or in the flowchart diagrams in a particular order, can be executed in a different order (e.g., a reverse order) or substantially simultaneously. Additionally, several method steps described below are optional and may not be executed.

The method can be used for fabricating a three-dimensional object using any known solid freeform fabrication technique, including, without limitation, three-dimensional printing.

The method begins at step 200 and continues to step 201 in which two or more materials are mixed to provide a building material characterized by at least one predetermined attribute. The predetermined attribute can be selected by the operator of the solid freeform fabrication apparatus used to fabricate the object. The mixing can be carried out using a mixing apparatus which may be part of the apparatus or external to it. A required quantity of one material may be poured into a container containing another material or, for example, injected into it. Alternately, one material may be mixed with another within the apparatus, before or in the course of building. The respective amounts and types of materials are selected so as to provide a building material (e.g., a modified modeling material) with one or more predetermined attributes. When one or more of the building materials is toxic or hazardous, such mixing within the apparatus maintains the safety of the user, e.g., by preventing skin contact or inhalation.

Each material preferably differs from all other materials by one or more attributes. The term "attribute" encompasses both the type of attribute and its specific value. For example, two or more materials may be building materials of different colors whose mixture or combination forms a different building material of a specific color which is a combination of the different colors. Other distinguishing attributes which are contemplated, include, but are not limited to, hardness, elasticity, translucency, polymerizability, viscosity, density, electrical conductivity, magnetization and any collection of two or more of such attributes. A distinguishing attribute can either correspond to the material prior to its hardening (pre-hardening attributes) or after hardening (post-hardening attributes).

One or more of the materials can be building material additives (e.g., colorants, curing agents such as initiators, conductivity control agents, charge control agents, magnetic additives, etc.) which are selected to provide the mixture with the desired attribute. An additive can be characterized as a material which is usually only required to be added to the base material in relatively small amounts. For example the volume of the additive can be 50% of the bulk or less Other amounts of additives may be required, depending on the property or attribute desired and/or its desired intensity. One advantage of using additives is that the mixing vessel can be the very same vessel that holds the bulk modeling material. In this embodiment the additive is added to the container containing the bulk modeling material. Individual building materials may not necessarily be ready for use in building without first being mixed with other materials. For example, they may not be formulated for use in three-dimensional building. As an example, a material intended for use in building a three-dimensional object may lack a curing agent (e.g., initiator), and only after such agent is added to the material, is it ready for use in SFF. This is particularly useful, e.g., for overcoming the limitations of a relatively short shelf-life of the modeling material, where its shelf life is shortened after and/or due to being mixed with the curing agent.

According to a preferred embodiment of the present invention the method continues to step 202 in which the building material is loaded into a solid freeform fabrication apparatus. A preferred type of fabrication apparatus is a three-dimensional printing apparatus, such as an ink-jet printing apparatus, for example, the apparatus disclosed in, e.g., U.S. Pat. Nos. 6,259,962, 6,569,373, 6,658,314, 6,850,334, 7,183,335, 7,209,797 and 7,225,045, and U.S. Application Publication Nos. 20060127153 and 20070179656, all assigned to the common assignee of the present invention and fully incorporated herein by reference. For example, a solid freeform fabrication apparatus according to the teachings of U.S. Application Publication No. 20060127153 can be used, in which case the apparatus can have one or more material containing cartridges.

In various exemplary embodiments of the invention the mixing is performed shortly before the loading step. In one embodiment, the mixing is carried out less than 24 hours, more preferably less than 12 hours, more preferably less than 6 hours, more preferably less than 3 hours, say about 1 hour or less before loading. Both mixing and loading are preferably performed in the same facility, i.e., on site, optionally by the same individual or group of individuals, e.g., the operator/s of the solid freeform fabrication apparatus. The advantage of mixing the materials shortly before loading is that it reduces the length of interaction between the materials. This is particularly useful when the shelf-life of each material is longer than the shelf-life of the mixture. For example, when one material is an additive (e.g., a hardening additive), it is typically desired to shorten the time of interaction between the additive and the bulk.

The advantage of performing the mixing and loading on site, is that it enables a more accurate selection of the relative amounts of the materials. Unlike the common situation in which the user purchases a previously prepared mixture, and hence is forced to select from a discrete set of mix ratios, the present embodiments practically facilitate a continuum of mix ratios, because the user is in a position to determine and prepare the mixture himself.

When the mixing is performed in a mixing container which is compatible with the loading station of the fabrication apparatus, the entire mixing container with the building material, i.e., mixed building material can be loaded to the fabrication apparatus, e.g. a loadable cartridge. Alternatively, the building material can be transferred, manually or automatically, to a loadable container which can then be loaded into the loading station of the fabrication apparatus.

Optionally and preferably, the method continues to step 203 in which data pertaining to the respective amounts of materials and/or the attribute(s) of the building material are fed to the fabrication apparatus. The feeding can be done manually using a user-interface (e.g., a keyboard, a touch screen, etc.). Alternatively, the loadable container can be supplemented with a computer readable medium containing the data, in which case the fabrication apparatus automatically reads the data from the medium.

The fabrication apparatus preferably comprises data processing means, such as a computer supplemented with a suitable three-dimensional fabrication algorithm which receives the data and calculates the optimal fabrication parameters, according to the amount of each material in the mix. For example, if the injection rates of two or more materials differ, the expected injection rate of the mix is a combination of the individual rates of the mix component, taking into account the relative proportion of the components. After the injection rate of the mix is computed, the algorithm determines the layer thickness according to which the tray moves from layer to layer. A similar example is the irradiation intensity used for curing. Knowing the required irradiation power of the mix ingredients and the relative proportions of the components enables computation of the required irradiation power of the mix.

The method proceeds to step 204 in which a three-dimensional object is printed.

The method ends at step 205.

Figure 2A:
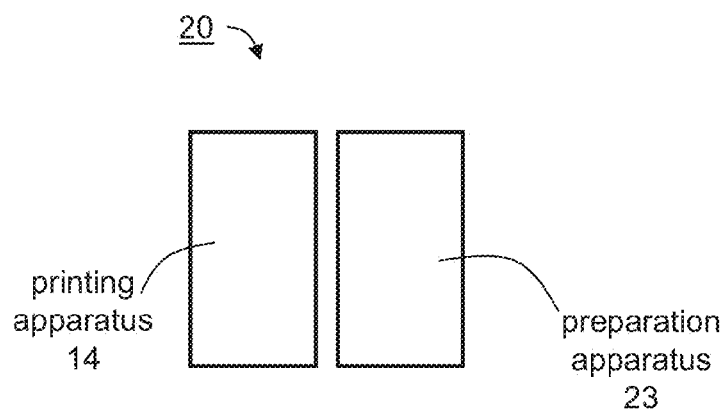
FIG. 2a is a schematic illustration of a system for solid freeform fabrication, according to various exemplary embodiments of the present invention.
Figure 2B:
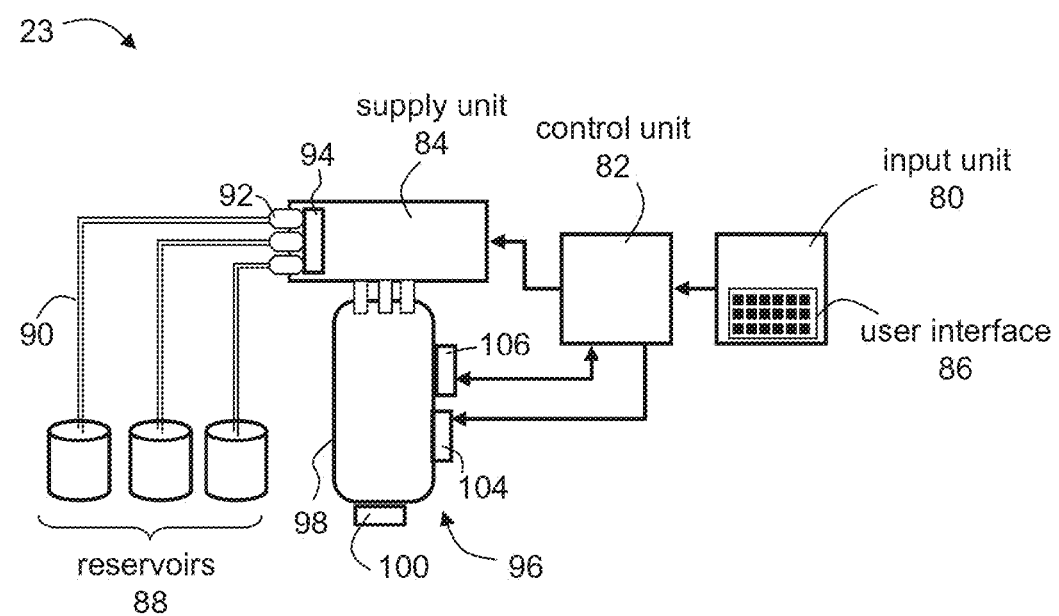
FIG. 2b is a schematic illustration of a preparation apparatus, according to various exemplary embodiments of the present invention.
Figure 2C:
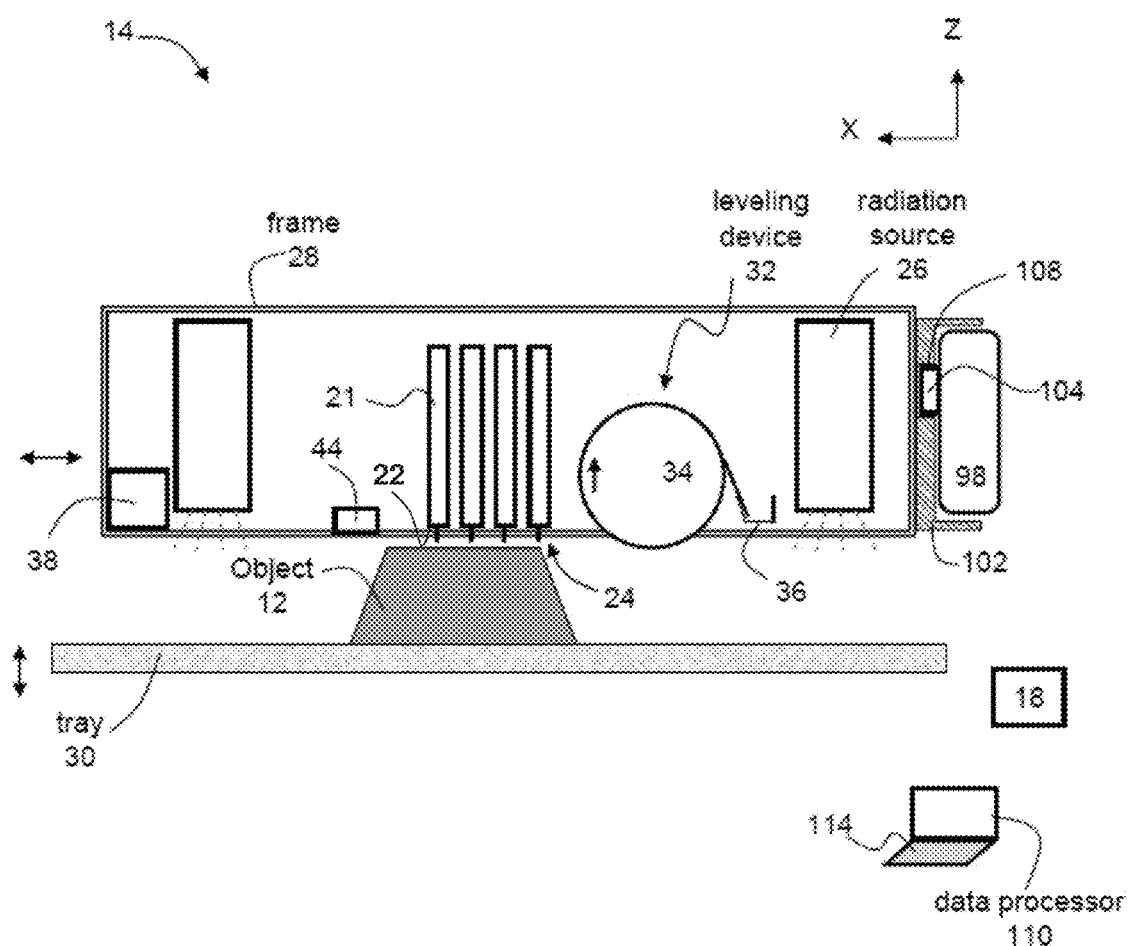
FIG. 2c is a schematic illustration of a solid free form fabrication apparatus, according to various exemplary embodiments of the present invention.

Reference is now made to FIGS. 2*a-c* which are schematic illustrations of a system 20 for solid freeform fabrication, according to various exemplary embodiments of the present invention. System 20 comprises a preparation apparatus 23, for preparing the building material, and a solid freeform fabrication apparatus 14, for fabricating a three-dimensional object using the building material.

Preparation apparatus 23 prepares the building material by mixing respective amounts of materials according to one or more attributes selected by the user. Broadly speaking, there can be more than one mode of operation for preparation apparatus 23. In one such mode, preparation apparatus 23 operates generally concurrently with fabrication apparatus 14. In this embodiment, an initial supply of building material is preferably prepared by apparatus 23 and used by apparatus 14 for the fabrication. Additional amounts can be prepared by apparatus 23 while the fabrication is in progress. In another mode, the operations of fabrication apparatus 14 and preparation apparatus 23 are intermittent such that in each fabrication cycle a predetermined amount of building material is prepared by apparatus 23 and used by apparatus 14. In an additional mode of operation, preparation apparatus 23 prepares a sufficient amount of building material and the fabrication process follows the preparation process.

Thus, the process of preparation can be performed simultaneously, intermittently or serially with the process of fabrication. Preparation apparatus 23 and fabrication apparatus 14 can be provided as separate units or they can be incorporated into a single preparation-fabrication unit, as desired. A single preparation-fabrication unit is particularly useful in the embodiments in which the preparation and fabrication are simultaneous or intermittent. Two separate units can be used in the embodiment in which the fabrication is subsequent to the preparation.

The principles and operations of preparation apparatus 23 are described first, with reference to FIG. 2b, and the principles and operations of solid free form fabrication apparatus 14, according preferred embodiments of the present invention are described hereinafter with reference to FIG. 2c.

In various exemplary embodiments of the invention, preparation apparatus 23 comprises an input unit 80, for inputting the desired attribute or attributes of the building materials, a control unit 82 which transmits data pertaining to the respective amounts of the materials, and a supply unit 84 which supplies the materials according to the data.

Input unit 80 preferably comprises a user interface 86 which can be of any type known in the art, such as, but not limited to, a keyboard, a touch screen and the like. Building material attributes are input using interface 86 either by inputting the parameters of the desired attributes or by selecting an attribute from a predetermined list of attributes. For example, user interface 86 can present a color palette, a list of viscosity values, a list of electrical properties and/or a list of magnetic properties, and the operator can select the color, viscosity, electrical property and/or magnetic property of the building material. Other attributes and groups of attributes are also contemplated.

Control unit 82 is preferably supplemented with an algorithm which receives the parameters of the desired attribute from unit 80 and determines the amounts of materials according to the desired attribute(s), either by calculating the amounts or using a lookup table. The algorithm can also include an interpolation procedure for interpolating the entries of the lookup table. For example, when it is desired to prepare a modeling material of a particular color, each entry of the lookup table corresponds to a different color which is defined by a set of color parameters (e.g., L*, a*, b* values, X, Y, Z values or parameters of any other appropriate color space), and includes the respective amounts of materials required to prepare the specific color. The algorithm is preferably capable of accessing an attribute database which includes the attributes of each material and/or each combination of materials which is presented to the user. For example, the attribute database can be a color database including absorption and scatter spectra of materials and various combinations thereof.

The user can select materials and material combinations using a look up table. Such look up table may for example provide lists, windows and/or drop down menus providing a list of attributes, a list of materials and/or a list of material additives and/or relative amounts of materials. The user may select for example a desired attribute or attributes, and the table (system) will provide a list of material and/or additive combinations which would provide a modeling material or a mixed material having or which would provide the desired attributes, and their relative amounts; i.e. the relative amount of each material to be used, in order to attain the desired attribute.

In one embodiment, the mixture is prepared by manually adding materials to a mix container, where the relative amount of the materials is determined using a lookup table. Adding an additive to a modeling material can be done by injecting the additive into the modeling material container using a syringe, e.g., via a puncturable cap (e.g., a rubber cap) of the container. The mixing can be performed, for example, by manually shaking the container. When adding only a minute amount of material to another material (such as in the case of adding additives), the container containing the bulk of the material can play the role of the mix container. In some embodiments, the container is the same container that is loaded to the solid freeform fabrication apparatus, e.g., a loadable cartridge of building material.

According to a preferred embodiment of the present invention apparatus 23 further comprises a computer readable medium 104 which stores, in a retrievable format, data pertaining to the respective amounts of materials in the mix and/or the attribute/s of the building material. Computer readable medium 104 can also store other types of data. For example, medium 104 store information whether or not container 98 has been used by a solid freeform fabrication apparatus, or the number of times and/or duration for which container 98 was in operation. Medium 104 can also store the total amount of material in container 98 and the like. Medium 104 is in communication with unit 82 which transmits the data thereto. Examples for computer readable media suitable for the present embodiments include, but are not limited to, flash cards, compact flash cards, miniature cards, battery-backed SRAM cards, disk drives (e.g., magnetic, optical, semiconductor), CD-ROMs, floppy disks, solid state floppy disk cards and the like.

Supply unit 84 is associated with reservoirs 88 of materials. The materials flow, e.g., via a system of conduits 90, from reservoirs 88 to supply unit 84. At least some of reservoirs 88 may comprise regular containers which are compatible with a material loading station 102 in apparatus 14, i.e., the containers may be loadable cartridges. The respective amounts of materials received by unit 84 are preferably controlled by a flow control device 92 which may include one or more valves, one or more pumps, or an arrangement of valves and pumps. Device 92 communicates directly or indirectly with control unit 82 and is optionally configured to enable and/or disable flow of material in the conduits. Supply unit 84 can further comprise an amount-measuring device 94 for measuring the amount (weight and/or volume) of materials flowing in each conduit.

The mixing of materials may be performed immediately or shortly before deposition of the mixed or modified materials in a layer being printed. An example of this is obtained when modeling material is fed to a modeling material reservoir (not shown) situated immediately near printing heads 21, and another modeling material or additive is fed into the same reservoir, and both are mixed together in the reservoir by a mixing mechanism. The mixed material is then supplied directly to the inkjet printing heads.

Preparation apparatus 23 further comprises a container 98, which receives the materials. A mixing mechanism 100, such as, but not limited to, a rotating element and/or a shaker, can be employed for mixing the materials which make up the building material. Mixing mechanism 100 can be mounted either externally to container 98, as shown in FIG. 2b, or it can be placed within container 98. In an alternative embodiment, the mixing is performed manually, for example, by shaking the container.

Preferably, but not obligatorily, container 98 is detachable from apparatus 23. The use of a detachable container is generally advantageous for maintenance purposes. In particular, a detachable container is advantageous when apparatus 23 and 14 are separate units. In this embodiment, container 98 is preferably compatible with a material loading station 102 in apparatus 14 (not shown in FIG. 2b, see FIG. 2c), i.e., the compatible container is a loadable cartridge. Thus, once the building material (or modified modeling material) is prepared, the operator can detach container 98 from apparatus 23 and load it to loading station 102. Computer readable medium 104 of apparatus 23 (in the embodiment in which such medium is employed) can be mounted on container 98 and loading station 102 can be designed and configured to automatically retrieve the data from medium 104.

In various exemplary embodiments of the invention apparatus 23 comprises one or more attribute measuring devices 106 which measure one or more of the attributes of the building material, or building material additive. Device(s) 106 can be configured to measure intensive properties (e.g., color, viscosity, electrical conductivity or resistivity, magnetization per unit volume, viscosity, temperature) and/or extensive properties (e.g., magnetization, resistance, conductance, weight, volume, charge). For example, in one embodiment, device 106 comprises a color meter or a spectrophotometer in which case the absorption and scattering spectra of the building material are measured to determine the color of the material, in another embodiment, device 106 comprises an ohm meter, in which case the resistance or conductance of the material is measured to determine, e.g., the resistivity or conductivity of the material, and in an additional embodiment, device 106 comprises a viscometer, in which case the viscosity of the building material is measured. Other attribute measuring devices are not excluded from the scope of the present invention.

The measured attributes of the building material can be used as a feedback to control unit 82. In this embodiment, control unit 82 receives data from device 106 and determines whether or not the measured property complies with the requirements received from input unit 80. If there is insufficient compatibility between the measured attributes and the attributes inputted to unit 80, control unit 82 preferably recalculates the respective amounts and signals supply unit 84 to add the appropriate materials to the mixture. Unit 82 can also store the measured attribute(s) in medium 104.

FIG. 2c is a schematic illustration of solid freeform fabrication apparatus 14 in a preferred embodiment in which the apparatus is a three-dimensional printing apparatus.

In various exemplary embodiments of the invention apparatus 14 comprises one or more printing heads 21 having one or more nozzle arrays 22, through which building material 24 is dispensed. Printing heads 21 serve as layer-forming heads. Apparatus 14 can further comprise one or more radiation sources 26, which can be, for example, an ultraviolet or infrared lamp, other source of electromagnetic radiation, visible light or electron beam, depending on the building material being used. Radiation source 26 serves for curing the building material.

Printing head 21 and radiation source 26 are preferably mounted on a frame or printing block 28 operative to reciprocally move along a tray 30, which serves as the working surface on which a three-dimensional object 12 is printed. According to the common conventions, tray 30 is positioned in the X-Y plane. Tray 30 is configured to move vertically (along the Z direction), typically downward.

Apparatus 14 preferably comprises a controller 18 which controls the operation of apparatus 14 to ensure that the layers are properly formed.

Controller 18 may be located either within apparatus 14 or it can communicate externally therewith via wire and/or wireless communication. Controller 18 preferably comprises, or operates in combination with, a data processor 110 which transmits building instructions to controller 18, based on, for example, a predetermined CAD configuration which may be converted, for example, to a Solid Triangulated Language (STL) or a Slice (SLC) format used by the data processor.

Supporting software in processor 110 uses computer object data representing the desired dimensional configuration of object 12 and transmits building instructions to be executed by controller 18. Specifically, a suitable algorithm in the supporting software creates the geometry of the object, and slices the geometry into the desired number of layers. Each layer is preferably described in the form of bitmaps as further detailed hereinabove or as generally known in the art.

Apparatus 14 typically comprises motion devices which are responsive to signals transmitted by controller 18. These motion devices operate to establish relative translational motions between head 21 and tray 30 both in the X-Y plane, and in the Z direction.

Apparatus 14 preferably comprises a loading station 102 to which a loadable container 98 filled with building material 112 is loaded. In the embodiments in which computer retable medium 104 is mounted on container 98, apparatus 14 is preferably capable of retrieving data stored in medium 104 and/or writing data on medium 104. This can be achieved by any technique known in the art. For example, loading station 102 can be provided with a connector 108, such as a serial or parallel bus, which facilitates data transfer to and/or from medium 104 to apparatus 14. Apparatus 14 can also comprise a reading and/or writing functionality which is configured to read and/or write the data from medium 104. The reading/writing functionality can be implemented within controller 18 or within processor 110. Alternatively, the data can be manually fed to data processor 110 e.g., by means of a user interface 114. Based on the data (received automatically or manually) data processor 110 can calculate the printing parameters and transmits the parameters to controller 18.

In various exemplary embodiments of the invention, apparatus 14 further comprises one or more leveling devices 32 which can be manufactured as a roller 34 or a blade. Leveling device 32 serves for straightening the newly formed layer prior to the formation of the successive layer thereon. Leveling device 32 preferably comprises a waste collection device 36 for collecting the excess material generated during leveling. Waste collection device 36 may comprise any mechanism that delivers the material to a waste tank or waste cartridge.

Preferably, apparatus 14 comprises a sensing device 44 which may be, for example, embedded within leveling device 32 or may be external thereto. Sensing device 44 serves to determine whether a collision with object 12 has occurred or is expected to occur. Such a collision may be, for example, as a result of dispensed layers being too thick and/or inconsistent in thickness, and/or because of a mechanical malfunction of the printing head. Collision may also occur as a result of material spill or faulty material dispensing that may occur anywhere in the path of the printing head. For example, sensing device 44 may be or include an acceleration-sensing device, a shock sensor and the like.

According to a preferred embodiment of the present invention apparatus 14 further comprises a cooling unit 38 for cooling object 12 and or apparatus 14. Unit 38 may comprise a blowing unit and/or a sucking unit, for respectively cooling apparatus 14 by sucking hot air or other substances out of apparatus 14 and/or drawing cool air or other substances in to apparatus 14 from the surroundings.

In use, printing head 21 moves in the X direction and dispenses the building material in the course of its passage over tray 30, in a predetermined configuration. The passage of head 21 is followed by the curing of the deposited material by radiation source 26. In the reverse passage of head 21, back to its starting point for the layer just deposited, an additional dispensing of building material may be carried out, according to a predetermined configuration. In the forward and/or reverse passages of head 21, the layer thus formed may be straightened by leveling device 32, which preferably follows the path of head 21 in its forward and/or reverse movement.

Once head 21 returns to its starting point along the X direction, it may move to another Y position and continue to build the same layer by reciprocal movement along the X direction. Once the layer is completed, tray 30 is lowered in the Z direction to a predetermined Z level, according to the desired thickness of the layer subsequently to be printed. The procedure is repeated to form three-dimensional object 12 in a layer-wise manner.

In another embodiment, tray 30 may be displaced in the Z direction between forward and reverse passages of head 21, within the layer. Such Z displacement is carried out in order to cause contact of the leveling device with the surface in one direction and prevent contact in the other direction.

It is noted that the term "building material", as used herein may include any modeling material, support material and/or any suitable combination of materials suitable for use in the printing of three-dimensional objects or models. Building material may include material used to create objects, material used to support objects being built and/or other material used in the creation of objects, whether or not appearing in the final object. The printing may include different types and/or combinations of building materials. The term "Modeling material" may include material that is specially formulated for use in SFF, for building/printing three-dimensional objects.

The term "object" as used herein may include a structure that includes the object or model desired to be built. Such a structure may, for example, include modeling material alone or modeling material with support material. The terms "support" as used herein may include all structures that are constructed outside the area of the object itself. Support structures may comprise support material, modeling material and/or a combination of materials. The terms "layer" or "slice" as used herein may include portions of an object and/or accompanying support structures optionally laid one above the other in the vertical (e.g., Z) direction. The word layer may also be used to describe a three-dimensional envelope or skin.

According to various exemplary embodiments of the present invention, the building materials that may be used may be similar to the materials described in the aforementioned patent and patent applications (see, e.g., U.S. Pat. Nos. 6,259,962, 6,569,373, 6,658,314, 6,850,334, 6,863,859, 7,183,335, 7,225,045 and 7,300,619, and U.S. Application Publication Nos. 20040207124, 20070032563 and 20070179656). For example, photopolymer materials curable by the application of electromagnetic radiation or other materials suitable for three-dimensional object construction may be used. The photopolymer material may be of various types, including, for example, a photopolymer modeling material which may solidify to form a solid layer of material upon curing, and a photopolymer support material which may solidify, wholly or partially, or not solidify upon curing, to provide a viscous material, a soft gel-like or paste-like form and/or a semi-solid form, e.g., that may be easily removed subsequent to printing. The various types of photopolymer material may be dispensed separately or in any given combination, according to the hardness and/or elasticity of the object desired to be formed or any of its parts, or the support constructions required to provide object support during construction. Materials other than those described in the above patents and applications may also be used.

When it is desired to use a modeling material different to that presently in use in an SFF system, a material replacement step (resin replacement) may be necessary prior to use of the 'new' material. In an inkjet SFF system, for example, the step comprises replacement of containers or cartridges presently or most recently in use with containers or cartridges holding other modeling materials, and clearing the conduits and nozzles through which the materials pass of remnants of the previously used materials.

In one embodiment of the invention, the building material comprises acrylic monomers, e.g. ethoxylated bisphenol A diacrylate, and free radical photo-initiators, e.g., bisacylphosphine oxide (BAPO's).

The free radical photo-initiator may be any compound that produces a free radical on exposure to radiation such as ultraviolet or visible radiation and thereby initiates a polymerization reaction. Non-limiting examples of some suitable photo-initiators include benzophenones (aromatic ketones) such as benzophenone, methyl benzophenone, Michler's ketone and xanthones; acylphosphine oxide type photo-initiators such as 2,4,6-trimethylbenzolydiphenyl phosphine oxide (TMPO), 2,4,6-trimethylbenzoylethoxyphenyl phosphine oxide (TEPO), and bisacylphosphine oxides (BA-PO's); benzoins and bezoin alkyl ethers such as benzoin, benzoin methyl ether and benzoin isopropyl ether and the like. Examples of photo-initiators are alpha-amino ketone, marketed by Ciba Specialties Chemicals Inc. (Ciba) under the trade name Irgacure 907, and bisacylphosphine oxide (BAPO's), marketed by Ciba under the trade name I-819.

The free-radical photo-initiator may be used alone or in combination with a co-initiator. Co-initiators are used with initiators that need a second molecule to produce a radical that is active in the UV-systems. Benzophenone is an example of a photoinitiator that requires a second molecule, such as an amine, to produce a curable radical. After absorbing radiation, benzophenone reacts with a ternary amine by hydrogen abstraction, to generate an alpha-amino radical which initiates polymerization of acrylates. Non-limiting examples of a class of co-initiators are alkanolamines such as triethylamine, methyldiethanolamine and triethanolamine. In one embodiment of the present invention, the composition suitable for building a three-dimensional object may include a sulfur-containing component or a curable compound, which is a sulfur-containing component. In an embodiment of the present invention, the sulfur-containing component is beta mercaptopropionate, mercaptoacetate, alkane thiols or any combination thereof. The sulfur-containing component may be any sulfur-containing component. The addition of sulfur-containing components may significantly enhance the composition reactivity. At levels of about 5% of sulfur-containing component a significant reactivity enhancement is achieved. The mechanical properties of the composition may be determined depending on the sulfur-containing component used. An example of a sulfur-containing component according to an embodiment of the present invention may be trimethylolpropane tri(3-mercaptopropionate), manufactured by BRUNO BOCK Chemische Fabrik GMBH & CO. Other suitable substances may be used.

In some embodiments of the invention a composition for SFF process is provided. The composition comprises a photo-initiator, hardens quickly only upon exposure to UV or V is (visible) radiation, but with improved color (that is, less yellow than, for example, FullCure 720 from Objet Geometries Ltd, Israel). In some embodiments, the requirement to harden quickly only upon exposure to UV or V is (visible) radiation means that in the absence of radiation, the viscosity of the composition at the SFF working temperature remains constant, within a limit of about 3 cps for at least 30 days aging at 40° C. The SFF working temperature is between about 50° C. and 100° C.

It was found by the present inventors that adding about 5% of a sulfur containing compound to the composition might results in lowering the yellow color, however, this also results in poor stability of the composition to an extent that replacing a first cartridge of printing composition with another, that was manufactured a few days apart of the first, might require calibration of the printing machine.

It was also found by the inventors that using less photo initiators results in stronger cured material.

It was surprisingly found that a minute amount of sulfur containing compound, defined as less than 3% of the composition, for example, 1% of the composition, is sufficient to reduce the yellow color. The lowest concentration of sulfur-containing additive in compositions according to the invention is optionally between 0.1% and 0.25%.

In some embodiments, the composition includes polymerizable components, and: (i) a reduced amount of photo-initiator, and (ii) the minimal amount of sulfur-containing additive required to achieve satisfactory photo curing of the composition. The term "reduced amount" as used herein refers to an amount that would not cure the composition satisfactorily in the absence of the sulfur-containing additive. Satisfactory curing is curing that provides desired results, under normal operation conditions of the 3D printer. In some embodiments, the desired results are at least 30% reactivity at the Menifa test.

In some embodiments, more than one photo-initiator is used. For example, two photo-initiators are used, a first for appropriate surface curing, and a second, for appropriate bulk curing of composition. Optionally, such a mixture of photo-initiators is used together with a sulfur-containing component.

It should be understood that the exact concentration of the different components of the present invention are a function of the lamp used and the exposure conditions.

In some embodiments, the composition for use in the manufacture of the three-dimensional objects includes at least one reactive component, at least one photo-initiator, at least one surface-active agent and at least one stabilizer. The composition may be formulated so as to be compatible for use with ink-jet printers and to have a viscosity at room temperature above 50 cps.

Compositions suitable for use as a first building material, a second building material and as a supporting material, according to various exemplary embodiments of the present invention will now be described.

The first building material and second building material of the present embodiments are especially designed and formulated for building a three-dimensional object using three-dimensional printing. Accordingly, in accordance with an embodiment of the present invention, the first building material and the second building material each have a first viscosity at room temperature, and a second viscosity compatible with ink-jet printers at a second temperature, which may be the same or different, wherein the second temperature is higher than room temperature, which is defined as about 20-30° C.

In one embodiment of the present invention, the first and the second building materials are designed to have increased viscosity at room temperature, which is defined as about 20-30° C. In another embodiment, the first and second building material have a viscosity greater than 50 cps at room temperature. In another embodiment, the viscosity may be between 80 and 300 cps. In another embodiment, the first and the second building material may have a viscosity of around 300 cps at room temperature.

In one embodiment of the present invention, the first building material and the second building material may have a second viscosity compatible with ink-jet printing, at a second temperature which may be higher than room temperature. In another embodiment, a composition compatible with ink-jet printing may have a low viscosity, for example, below 20 cps at the printing temperature, in order to function properly in the printing process. In another embodiment, the first building material and the second building material, upon heating, have a viscosity preferably below 20 cps that may enable the construction of the three-dimensional object under heat. In one embodiment of the present invention, the temperature typically used to build the three-dimensional model of the present embodiments is higher than 60° C. In another embodiment, the temperature may be about 85° C. In one embodiment of the present invention, the first and second building materials may have a viscosity of 8-15 cps at a temperature greater than 60° C. In another embodiment, the first and second building materials may have a viscosity of 11 cps at a temperature of about 85° C.

Having this viscosity, the first and second building material in one embodiment may be distinguished from prior art formulations designed for ink-jet printing, which have low viscosity at room temperature, the temperature at which the printing is normally conducted. High viscosity at room temperature is a desirable property for three-dimensional objects, a feature that is lacking in the prior art formulations. Of course, other embodiments may have other viscosities.

The first building material (typically, the model material) is a composition suitable for building a three-dimensional object. The composition is optionally formulated to give, after curing, a solid material. In one embodiment, curing of the composition results in a solid material, with mechanical properties that permit the building and handling of that three-dimensional object. In another embodiment, curing the composition results in a solid elastomer-like material, with mechanical properties that permit the building and handling of the three-dimensional object.

In some embodiments, the modeling material comprises a reactive component, a photo-initiator, and a sulfur-containing component. Optionally, the modeling material also comprises a surface active agent. Optionally, the modeling material is substantially free of stabilizers, other than those originating in the commercially available starting materials. This is sometimes a preferred option, as some stabilizers contribute to undesired coloration, and are inefficient in stabilizing a composition that contains a sulfur-containing additive. In addition commercially available raw materials already contain stabilizers.

In an exemplary embodiment, the first building material has a first viscosity of about 50-500 cps at ambient temperature, and a second viscosity lower than 20 cps at a temperature higher than the ambient temperature, and the cured composition is solid.

Some optional ranges for the ambient temperature are: between 20-30° C., between 10-40° C., between 15-35° C., and between 20-30° C.

Exemplary values of temperatures higher than ambient include: at least 40° C., at least 50° C., at least 60° C. and at least 70° C.

Exemplary reactive components include a mono-functional (meth)acrylic monomer, a poly-functional (meth)acrylic monomer (that is, a monomer having two or more meth(acrylic) functional groups), a (meth)acrylic oligomer, or any combination thereof, for example, a combination of a mono-functional monomer and a di-functional oligomer.

Optionally, the mono-functional acrylic monomer produce upon curing a high Glass Transition Temperature (Tg) polymer. Optionally, the di-functional oligomer produces upon curing a low Glass Transition Temperature polymer. The term Glass transition temperature (Tg) is defined as the temperature at which a polymer changes from hard and brittle to soft and pliable material.

The Glass Transition Temperature of the polymerized mono-functional acrylic monomer is optionally higher than 60° C., optionally higher than 70° C., optionally in the range of 70-110° C.

The Glass Transition Temperature of the polymerized di-functional oligomer is optionally lower than 40° C., optionally lower than 30° C., optionally in the range of 20-30° C.

In an exemplary embodiment the Glass Transition Temperature of the polymerized mono-functional acrylic monomer is higher than 60° C. and the Glass Transition Temperature of the polymerized di-functional oligomer is lower than 40° C.

In one embodiment of the present embodiments, the composition may include at least 20% of the high Glass Transition Temperature mono-functional monomer. In another embodiment, the composition may include at least 30% of the high Glass Transition Temperature mono-functional monomer. In another embodiment, the composition may include at least 50% of the high Glass Transition Temperature mono-functional monomer. In another embodiment, the composition may include between 20-50% of the high Glass Transition Temperature mono-functional monomer. In another embodiment, the composition may include between 30-60% of the high Glass Transition Temperature mono-functional monomer.

In one embodiment of the present embodiments, the composition may include about 20% of the low Glass Transition Temperature di-functional oligomers. In another embodiment, the composition may include about 40% of the low Glass Transition Temperature di-functional oligomers. In another embodiment, the composition may include between 20-40% of the low Glass Transition Temperature di-functional oligomers. In another embodiment, the composition may include at least 20% of the low Glass Transition Temperature di-functional oligomer. In another embodiment, the composition may include not more than 40% of the low Glass Transition Temperature di-functional oligomer.

In one embodiment of the present invention, the composition may include at least 40% of the high Glass Transition Temperature mono-functional monomers and at least 20% of the low Glass Transition Temperature di-functional oligomer.

In one embodiment of the present invention, the composition may include at least 20% of the high Glass Transition Temperature mono-functional monomers and not more than 40% of the low Glass Transition Temperature di-functional oligomer.

An (meth)acrylic monomer is a functional acrylated or methacrylated molecule which may be, for example, esters of acrylic acid and methacrylic acid. Monomers may be mono-functional or multi-functional (for example, di-, tri-, tetra-functional, and others). An example of an acrylic mono-functional monomer is phenoxyethyl acrylate, marketed by Sartomer under the trade name SR-339. An example of an acrylic di-functional monomer is propoxylated (2) neopentyl glycol diacrylate, marketed by Sartomer under the trade name SR-9003.

An (meth)acrylic oligomer is a functional acrylated or methacrylated molecule which may be, for example, polyesters of acrylic acid and methacrylic acid. Other examples of acrylic oligomers are the classes of urethane acrylates and urethane methacrylates. Urethane-acrylates are manufactured from aliphatic or aromatic or cycloaliphatic diisocyanates or polyisocyanates and hydroxyl-containing acrylic acid esters. An example is a urethane-acrylate oligomer marketed by Cognis under the trade name Photomer-6010.

A poly-functional (meth)acrylic monomer is a molecule which may provide enhanced crosslinking density. Examples of such molecules include Ditrimethylolpropane Tetra-acrylate (DiTMPTTA), Pentaerythitol Tetra-acrylate (TETTA), Dipentaerythitol Penta-acrylate (DiPEP). In one embodiment of the present invention, the composition may further include, inter alia, a curable component, which is a molecule having one or more epoxy substituents, a molecule having one or more vinyl ether substituents, vinylcaprolactam, vinylpyrolidone, or any combination thereof. In one embodiment of the present invention, the composition may further include, inter alia, vinylcaprolactam. Other curable components may also be used.

The modeling material may also include a curable component which is, for example, a molecule having one or more vinyl ether substituents. In one embodiment of the present invention, the concentration of component that includes a molecule having one or more vinyl ether functional groups is in the range of 10-30%. In another embodiment, the concentration is 15-20%. In another embodiment, the concentration is 15%. Of course, other concentrations, and other ranges, can be used. Conventional vinyl ether monomers and oligomers which have at least vinyl ether group are suitable. Examples of vinyl ethers are ethyl vinyl ether, propyl vinyl ether, isobutyl vinyl ether, cyclohexyl vinyl ether, 2-ethylhexyl vinyl ether, butyl vinyl ether, ethyleneglycol monovinyl ether, diethyleneglycol divinyl ether, butane diol divinyl ether, hexane diol divinyl ether, cyclohexane dimethanol monovinyl ether and the like. An example of a vinyl ether for the present embodiments is 1,4 cyclohexane dimethanol divinyl ether, marketed by ISP under the trade name CHVE.

In one embodiment of the present invention, the curable component of the modeling material (first building material) includes, inter alia, an acrylic monomer, an acrylic oligomer. In another embodiment, the curable component of the first building material includes an acrylic component as defined hereinabove and a molecule having one or more vinyl ether functional groups as defined hereinabove The photo-initiator of the first interface material and of the second interface material may be the same or different, and is optionally a free radical photo-initiator.

The free radical photo-initiator may be compounds that produce a free radical on exposure to radiation such as ultraviolet or visible radiation and thereby initiates a polymerization reaction. Non-limiting examples of some suitable photo-initiators include benzophenones (aromatic ketones) such as benzophenone, methyl benzophenone; acylphosphine oxide type photo-initiators such as 2,4,6-trimethyl-benzolydiphenyl phosphine oxide (TMPO), 2,4,6-trimethyl-benzoylethoxyphenyl phosphine oxide (TEPO); benzoins and bezoin alkyl ethers such as benzoin, benzoin methyl ether and benzoin isopropyl ether and the like. Examples of photo-initiators are alpha-amino ketone, marketed by Ciba Specialties Chemicals Inc. (Ciba) under the trade name Irgacure 907 and alpha hydroxyl ketones—Irgacure 184 and Irgacure 2959.

In an exemplary embodiment of the present invention, the first building material also includes a sulfur-containing additive. The sulfur containing additive is optionally selected from the group consisting of beta mercaptopropionate, mercaptoacetate, alkane thiols or any combination thereof. Some examples of beta mercaptopropionate are: glycol di (3-mercaptopropionate), pentaerythritol tetra (3-mercaptopropionate), and trimethylol propane tri (3-mercaptopropionate).

The addition of sulfur-containing additive may significantly enhances the composition reactivity, but many times this is accompanied with reduced stability.

A composition according to an exemplary embodiment of the invention comprises 40-60% mono-functional acrylic monomer, 15-30% bi-functional urethane acrylic compound, 15-30% bi-functional acrylic compound, 0.25-3% sulfur-containing component, 0.5%-3% photo initiator, and the rest other curable components, surface active agents, or other ingredients described herein according to the intended properties of the composition.

In one embodiment of the present invention, the composition suitable for building a three-dimensional object, further includes, inter alia, a low molecular weight polymer. An example of a low molecular weight polymer for the present embodiments is Styrene-Butadiene-Methacrylate block copolymers (KRATON D), manufactured by Dow Corning. Other suitable substances may be used.

In one embodiment of the present invention, the composition suitable for building a three-dimensional object, further includes, inter alia, a filler.

The term filler is defined as an inert material added to a polymer, a polymer composition or other material to modify their properties and/or to adjust quality of the end products. The filler may be an inorganic particle, for example calcium carbonate, silica and clay. Of course other filler substances may be used.

Fillers may be introduced in to polymer compositions in order to reduce shrinkage during polymerization or during cooling, for example to reduce the coefficient of thermal expansion, increase strength, increase thermal stability reduce cost and/or adopt rheological properties. The use of standard fillers has also some drawbacks such as reduction of elasticity and an increase in viscosity. Additionally, large diameter fillers (>5 micron) are not appropriate for ink-jet applications.

Nano-particles fillers are especially useful in applications requiring low viscosity such as ink-jet applications. Compositions containing as much as 30% nano-particle fillers are feasible, whereas the same concentration of more standard and higher diameter fillers (~>1 micron) produce at such concentration viscosities which are too high for ink-jet applications. In one embodiment of the present invention, the nano-particle filler containing composition is clear. The composition is clear (e.g. transparent) since it contains no visual fillers. In contrast, compositions containing more standard and higher diameter visible fillers (~>1 micron), are not clear.

In one embodiment of the present invention, the composition optionally may contain pigments. In a further embodiment of the present invention, the composition optionally may contain dyes.

In another embodiment, the pigment concentration may be lower than 35%. In another embodiment, the pigment concentration may be lower than 15%. And also lower than 1%.

In one embodiment of the present invention, the filler may include particles such as particles having an average diameter of less than 100 nm. In another embodiment, the filler may include particles having a diameter in the range of 10-100 nm. In another embodiment, the filler may include particles having a diameter in the range of 20-80 nm. In another embodiment, the filler may include particles having a diameter in the range of 10-50 nm. In another embodiment, the filler may include particles having a diameter smaller than 10 nm. Examples of fillers that may be used in the composition are HIGHLINK OG (particle size spanning between 9 nm to 50 nm), manufactured by Clariant, and NANOCRYL (particle size below 50 nm), manufactured by Hanse Chemie. Other suitable substances may be used In one embodiment of the present invention, the first viscosity is about 80-500 cps. In another embodiment, the first viscosity is about 300 cps. Of course, compositions having other viscosities may be used.

In one embodiment of the present invention, the second viscosity is lower than 20 cps and wherein the second temperature is higher than 60° C. In another embodiment, the second viscosity is between 10 and 17 cps and wherein the second temperature is higher than 60° C. In another embodiment, the second viscosity is between 10 and 17 cps and wherein the second temperature is about 70-110° C. In another embodiment, the second viscosity is between 12 and 15 cps and wherein the second temperature is about 70-90° C. Of course, compositions having other viscosities may be used.

Other components of the first interface material and the second interface material of the present embodiments are surface-active agents. A surface-active agent may be used to reduce the surface tension of the formulation to the value required for jetting or for printing process, which is typically around 30 dyne/cm. Examples of surface-active agents for the present embodiments are silicone surface additives, marketed by Byk Chemie under the trade names Byk.

Additional objects, advantages and novel features of the present embodiments will become apparent to one ordinarily skilled in the art upon examination of the following examples, which are not intended to be limiting. Additionally, each of the various embodiments and aspects of the present invention as delineated hereinabove and as claimed in the claims section below finds support in the following examples.

EXAMPLES

Reference is now made to the following examples, which together with the above descriptions illustrate the exemplary embodiments in a non-limiting fashion.

Example 1

Motivation
  (a) Reduce on-site stock and storage by enabling the use of a single modeling material to obtain different colors and/or different properties.
  (b) Increase material shelf life:
    (i) An additive, e.g., a curing agent, a hardening agent, a dye or pigment (color mix), might have a generally negative effect on the shelf life of the modeling material. By enabling the user to introduce the additive to the modeling material on site, per use and shortly before use, will enable the user to benefit from the full shelf life of the product.
    (ii) The additive being required in relatively small amounts could be refrigerated or otherwise stored under optimal conditions to further increase its shelf life.
Materials
  A cartridge containing modeling material.
  A set of syringes containing different additives, e.g., dye solutions or pigment dispersions or combinations between dyes and pigments. The syringes may be external or internal to the apparatus; and may be injected manually or automatically.
Method
  (a) Inject color or color mix: The user may decide when to inject or otherwise add the color mix to the cartridge, according to the user's requirements. The user may stock a number of different colors, and may also be able to use more than one color combination to achieve additional desirable colors.
  (b) Cartridge agitation: mixing of base modeling material and color mix additive/s.
  (c) Allow bubbles to dissipate.
  (d) Load cartridge to machine, as relevant.
  (e) Carry out material resin replacement if necessary.
  (f) Material ready for use.

Example 2

Motivation
  (a) Dual curing: Specially designed formulations containing dual curing components cannot be prepared by the resin manufacturer due to a short pot life. Once the components have been mixed, the pot life of some of such specially designed formulations may, in some cases, last only a few days, after which time, the product partially polymerizes, altering its properties to the extent that it is no longer appropriate for its intended use.
  (b) Example: hydroxyl reaction with isocyanate in addition to radical polymerization of acrylic double bonds.
Materials
  A cartridge containing modeling material.
  A syringe containing isocyanate component.
Method
  (a) Inject isocyanate
  (b) Cartridge agitation: mixing of base modeling materials and isocyanate.
  (c) Allow bubbles to dissipate.
  (d) Load cartridge to machine
  (e) Carry out material resin replacement if necessary
  (f) Build desired parts
  (g) Flush out system in order to remove reactive formulation from system, e.g., by carrying out resin replacement
  (h) Postcure parts at high temperature, if necessary.

Example 3

Motivation
  Thiolene reaction: This reaction, while having many advantages, suffers from very short formulation shelf life.
Materials
  A cartridge containing a metha/acryl modeling material.
  A syringe containing mercaptopropionate component.
Method
  (a) Inject mercaptopropionate.
  (b) Cartridge agitation: mixing of base modeling materials and mercaptopropionate.
  (c) Allow bubbles to dissipate.
  (d) Load cartridge to machine
  (e) Carry out material resin replacement if necessary
  (f) Material ready for building.

Other chemicals can also be mixed using this technique. For example, a formulation can be stable until the addition of a catalyst, a cross linker, etc.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A solid freeform fabrication system for preparing and dispensing a building material in layers to fabricate a three-dimensional object, the system comprising:
  preperation apparatus for preparing a building material for solid freeform fabrication, a computer, and
  fabrication apparatus having at least one printing head configured for receiving said building material and dispensing said building material in layers to fabricate the three-dimensional object;
  wherein the preparation apparatus comprises:
    an input unit, for inputting at least one attribute of the building material, said at least one attribute being selected from the group consisting of hardness, elasticity, translucency, polymerizability, viscosity, density, electrical conductivity, magnetization and any collection of two or more thereof;
a control unit, configured to transmit data pertaining to respective amounts of a plurality of different materials according to said at least one attribute, said control unit being supplemented with an algorithm for determining said amounts based on said at least one attribute;
a supply unit, operatively associated with reservoirs of said plurality of materials and being controllable by said control unit to supply a respective amount of materials according to said data; and
a container, configured for receiving said plurality of materials in which said plurality of materials are combined to provide a building material characterized by said at least one attribute,
wherein the fabrication apparatus comprises a controller for controlling an operation of said fabrication apparatus based on solid freeform fabrication parameters comprising at least one of (i) a dispensing rate of said building material, and (ii) irradiation intensity tor curing said building material;
and wherein said computer is configured for receiving data pertaining to said respective amounts and calculating said solid freeform fabrication parameters according to relative proportions of said different materials in said building material.

2. The system of claim 1, wherein said materials comprise a base modeling material and a plurality of additive materials, each additive material being able to produce at least one of said at least one attribute when mixed with said base modeling material.

3. The system of claim 2, wherein said base material comprises meth/acrylic functional groups and one of said plurality of additive materials comprises mercaptopropionate functional groups, wherein said algorithm is configured for accessing an attribute database which includes first attributes of said base material which comprises meth/acrylic functional groups, and second attributes of said additive material which comprises mercaptopropionate functional groups, and wherein at least one of said first attributes and/or at least one of said second attributes comprises said at least one attribute of the building material.

4. The system of claim 2, wherein said base material comprises a component containing hydroxyl functional groups and one of said plurality of additive materials comprises a component containing an isocyanate functional group, wherein said algorithm is configured for accessing an attribute database which includes first attributes of said base material which comprises hydroxyl functional groups, and second attributes of said additive material which comprises a component containing an isocyanate functional group, and wherein at least one of said first attributes and/or at least one of said second attributes comprises said at least one attribute of the building material.

5. The system of claim 1, wherein said building material is a UV curable composition, and wherein said algorithm is configured for accessing an attribute database which includes attributes of said UV curable composition, said attributes of said UV curable composition comprising said at least one attribute of the building material.

6. The system of claim 1, wherein said building material at least partially solidifies upon exposure to radiation selected from the group consisting of electromagnetic radiation and electron beam radiation, and wherein said algorithm is configured for accessing an attribute database which includes attributes of said material which at least partially solidifies upon exposure to said radiation, said attributes of said material which at least partially solidifies upon exposure to said radiation comprising said at least one attribute of the building material.

7. The system of claim 1, further comprising a mixer, configured for mixing said materials in said container to provide said building material.

8. The system of claim 1, further comprising at least one attribute measuring device, configured for measuring said at least one attribute of the building material and feed measurement data as a feedback to said control unit, wherein said control unit is configured to recalculate said amounts responsively to said measurement data.

9. The system of claim 1, wherein said supply unit comprises:
a plurality of conduits, each being in fluid communication with a reservoir of one material, and having a flow control device controllable by said control unit to enable and disable flow of material in said conduit; and
at least one amount-measuring device, designed and constructed to measure amounts of materials flowing in said plurality of conduits.

10. The system of claim 1, wherein said preparation apparatus is operable to mix said respective amounts of said plurality of materials, contemporaneously with said fabricating of said three-dimensional object.

11. The system of claim 1, wherein said preparation apparatus is operable to mix said respective amounts of said plurality of materials intermittently with said fabricating of said three-dimensional object.

12. The system of claim 1, wherein said preparation apparatus is operable to mix said respective amounts of said plurality of materials, serially with said fabricating of said three-dimensional object.

13. The system of claim 1, wherein said dispensing rate is a combination of individual dispensing rates of each of said different materials.

14. The system of claim 1, wherein said solid freeform fabrication parameters comprise a layer thickness calculated based on said injection rate.

15. The system of claim 1, wherein each printing head comprises least one nozzle array.

16. A method of fabricating a three-dimensional object, the method comprising:
preparing and dispensing a building material in layers to fabricate a three-dimensional object by operating a solid freeform fabrication system, wherein the system comprises:
preparation apparatus for preparing a building material for solid freeform fabrication, and
fabrication apparatus having at least one printing head configured for receiving said building material and dispensing said building material in layers to fabricate the three-dimensional object;
wherein the preparation apparatus comprises:
an input unit, for inputting at least one attribute of the building material, said at least one attribute being selected from the group consisting of hardness, elasticity, translucency, polymerizability, viscosity, density, electrical conductivity, magnetization and any collection of two or more thereof;
a control unit, configured to transmit data pertaining to respective amounts of a plurality of different materials according to said at least one attribute, said control unit being supplemented with an algorithm for determining said amounts based on said at least one attribute;

a supply unit, operatively associated with reservoirs of said plurality of materials and being controllable by said control unit to supply a respective amount of materials according to said data; and a container, configured for receiving said plurality of materials in which said plurality of materials are combined to provide a building material characterized by said at least one attribute;

wherein fabrication apparatus comprises a controller for controlling an operation of said fabrication apparatus based on solid freeform fabrication parameters comprising at least one of (i) a dispensing rate of said building material, and (ii) irradiation intensity for curing said building material;

and wherein the method comprises calculating said solid freeform fabrication parameters according to relative proportions of said different materials in said building material.

17. The method of claim 16, wherein said materials comprise a base modeling material and a plurality of additive materials, each additive material being able to produce at least one of said at least one attribute when mixed with said base modeling material.

18. The method of claim 17, wherein said base material comprises meth/acrylic functional groups and one of said plurality of additive materials comprises mercaptopropionate functional groups.

19. The method of claim 17, wherein said base material comprises a component containing hydroxyl functional groups and one of said plurality of additive materials comprises a component containing an isocyanate functional group.

20. The method of claim 16, wherein said building material is a UV curable composition.

21. The method of claim 16, wherein said building material at least partially solidifies upon exposure to radiation selected from the group consisting of electromagnetic radiation and electron beam radiation.

22. The method of claim 16, wherein said dispensing rate is a combination of individual dispensing rates of each of said different materials.

23. The method of claim 16, wherein said solid freeform fabrication parameters comprise a layer thickness calculated based on said injection rate.

24. The method of claim 16, further comprising measuring said at least one attribute of the building material to provide measurement data, and recalculating said amounts responsively to said measurement data.

25. The method of claim 16, wherein each printing head comprises least one nozzle array.

* * * * *